(12) United States Patent
Natale

(10) Patent No.: US 6,978,900 B2
(45) Date of Patent: Dec. 27, 2005

(54) BRAIDED STRAINER FOR A DRAW LINE

(75) Inventor: Santo Natale, Brampton (CA)

(73) Assignee: Dependable Truck and Tank Limited, Ontario (CA)

( * ) Notice: Subject to any disclaimer, the term of this patent is extended or adjusted under 35 U.S.C. 154(b) by 305 days.

(21) Appl. No.: 10/193,186

(22) Filed: Jul. 12, 2002

(65) Prior Publication Data

US 2004/0007518 A1   Jan. 15, 2004

(51) Int. Cl.[7] .............................................. B01D 29/21
(52) U.S. Cl. ............... 210/483; 29/896.61; 29/896.62; 29/905; 210/497.01; 210/499; 210/505
(58) Field of Search ................ 210/335, 342, 210/354, 356, 460, 462, 497.01, 499, 416.1, 210/456, 483, 485, 503, 505, 497.1; 29/890.14, 29/896.61, 896.62, 890.61, 890.62, 905; 55/491, 492, 503, 527

(56) References Cited

U.S. PATENT DOCUMENTS 2,537,217 A * 1/1951 Farr ............................ 55/488
2,679,090 A * 5/1954 Farr ........................ 29/896.62
4,882,056 A * 11/1989 Degen et al. ............... 210/490
5,453,116 A * 9/1995 Fischer et al. ................ 95/278
5,647,128 A * 7/1997 Aikawa .................... 29/896.62
5,804,075 A * 9/1998 Aikawa ................. 210/497.01
5,968,357 A * 10/1999 Doelle et al. ................ 210/485

FOREIGN PATENT DOCUMENTS

GB    2 318 305    4/1998

* cited by examiner

Primary Examiner—Joseph Drodge
(74) Attorney, Agent, or Firm—Nixon Peabody LLP; Jeffrey L. Costellia

(57) ABSTRACT

A braided strainer for a draw line, and method of forming same. The strainer comprises a frame in the form of a pair of spaced planar plates, one being a solid end plate and the other having a control aperture. A plurality of spaced, parallel rods of similar length are positioned near the peripheries of the plates and secured and extending between the plates. A plurality of cylindrical walls of braided strands of strainer medium, are provided, the braided cylindrical walls having similarly spaced rod-receiving holes extending longitudinally in spaced fashion through the strands of strainer medium. These walls are contiguously stacked on the plates to extend between them. The plate having the central aperture permits flow of fluid drawn through the cylindrical walls during operation of the strainer. That plate has associated with it a connector to releasably secure the strainer to a mating connector on a free end of the draw line.

27 Claims, 5 Drawing Sheets

BRAIDED STRAINER FOR A DRAW LINE

FIELD OF THE INVENTION

The present invention relates to a strainer for filtering coarse debris from a fluid or from solids, the strainer usable for example with fire truck hoses for drawing water from rivers, lakes or ponds.

BACKGROUND OF THE INVENTION

Generally, when such strainers are used in a fluid, the strainer assembly is submerged into the fluid and always must have a means of connecting to a hose, piping or to a fixture, hereinafter called a "draw line". Strainers generally use a strainer medium formed from perforated sheets of specified orifice or openings or, as in the case of Avery et al. U.K. Patent No. 2,318,305, from a woven strands of material. The construction proposed by Avery et al. presents difficulties in that a woven material may be prone to tearing or dislocation of certain of the strands of strainer medium, making the strainer less effective. As well, constructing such a strainer, by weaving the fabric, is a laborious and time consuming process, resulting in a relatively expensive product.

Problems encountered with perforated sheets of specified orifice or openings include the creation of vortexes which, reduce the efficiency of the draw line. A vortex is defined as a whirling mass of fluid forming a vacuum at its center, into which anything caught in the motion is drawn. Natural vortexes caused by draw fluids are to be avoided where possible, since larger vortexes tend to draw more debris and clog up the strainers more quickly.

It is an object of the present invention to provide an improved draw line strainer which is economical to manufacture and effective in operation.

SUMMARY OF THE INVENTION

In accordance with the present invention there is provided a braided strainer for a draw line, and a method for making same. The method of forming the braided strainer comprises the steps of stacking a plurality of cylindrical strainer walls formed of braided strands of strainer medium and having similarly spaced rod-receiving holes extending linearly longitudinally in spaced fashion through the walls, onto parallel, upstanding rods of similar length, the rods secured to a base plate, by passing the rods through corresponding rod-receiving holes in the walls so that the braided walls are stacked on the plate up to the free ends of the rods in contiguous fashion, and securing a retainer plate on the free ends of the rods to secure the braided walls in stacked position on the rods. In one embodiment of the invention, the strainer walls are cylindrical.

In an alternative embodiment of the present invention, the method comprises forming a plate having a plurality of parallel, upstanding rods of similar length secured in spaced regular, upstanding, fashion about the plate, embedding a length of braided strands of strainer material, in spiral fashion to form a uniform strainer wall over the length of the rods and securing a retainer plate on free ends of the rods adjacent a portion of the length of strainer medium.

As well, the invention relates to a braided strainer for a draw line, the strainer comprising a frame in the form of a pair of spaced planar plates, one being a solid end plate and the other having a central aperture, and a plurality of spaced, parallel rods of similar length positioned near the peripheries of the plates and secured and extending between the plates. A plurality of cylindrical walls of braided strands of strainer medium, the braided cylindrical walls having similarly spaced rod-receiving holes extend longitudinally in spaced fashion through the strands of strainer medium, are contiguously stacked on the plates to extend between them. The plate having the central aperture permits flow of fluid drawn through the cylindrical walls during operation of the strainer into the draw line. That plate has associated with it a connector to releasably secure the strainer to a mating connector on a free end of the draw line.

In an alternative embodiment of the strainer according to the present invention, the braided strainer is double-walled, having a first, outer strainer and a second, smaller strainer within, both strainers being secured to the plate having the central aperture, so that the wall of the second strainer is inwardly spaced from the wall of the first strainer.

The strainer according to the present invention is relatively simple and economical to construct. Because of the braided wall construction of the strainer.

BRIEF DESCRIPTION OF THE DRAWINGS

These and other advantages of the invention will become apparent upon reading the following detailed description and upon referring to the drawings in which.

Figure 1:
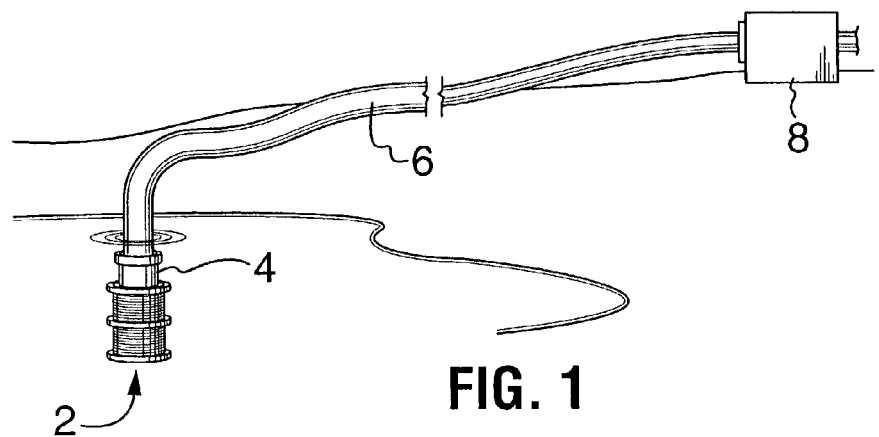
FIG. 1 is a schematic view of a strainer according to the present invention attached to the end of a draw line.
Figure 2:
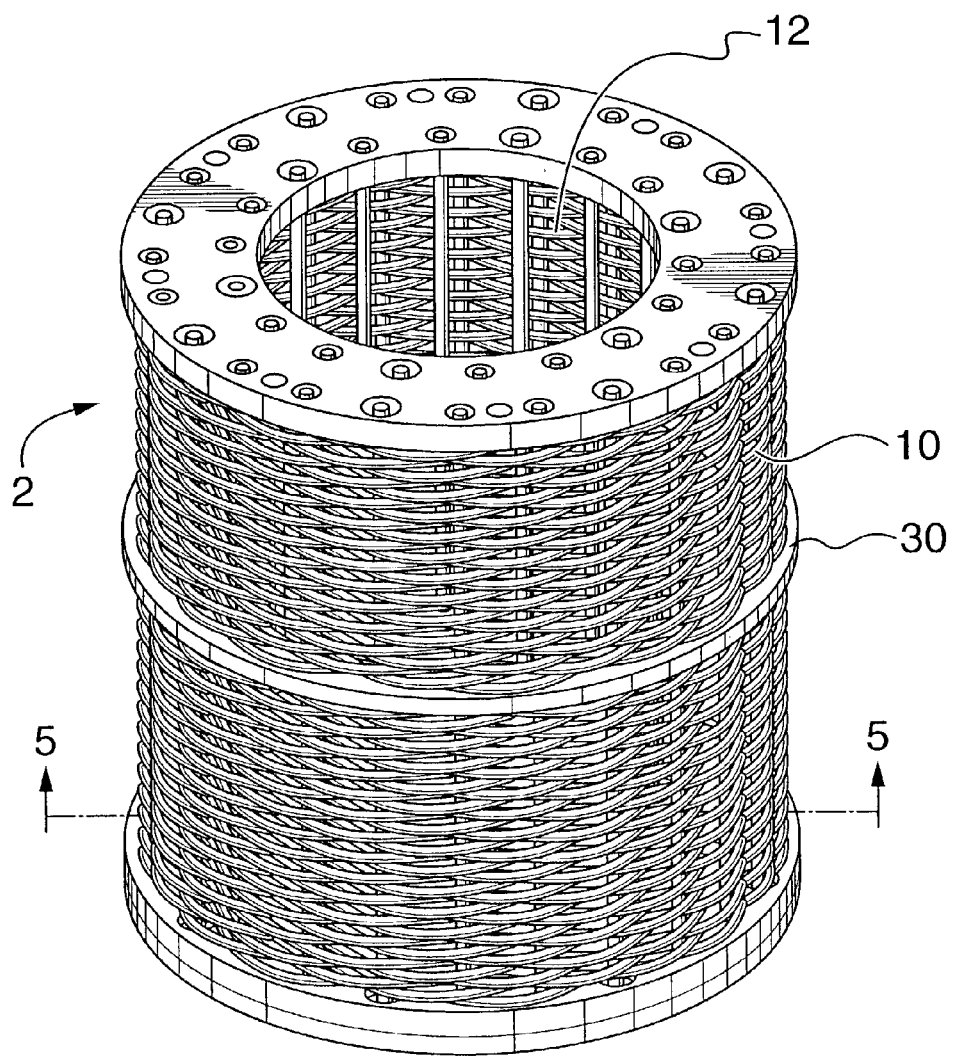
FIG. 2 is a perspective view of a strainer according to the present invention.

While the invention will be described in conjunction with illustrated embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE PREFERRED EMBODIMENTS

In the following description, similar features in the drawings have been given similar reference numerals.

Turning to FIG. 1 there is illustrated a strainer (2) in accordance with the present invention, secured by appropriate connection means (4) such as a bolted flange (illustrated), or (not illustrated) a hose shank connector, cam lock connection, storks connection, threaded swivel connection or the like, to a mating connector on draw line (6) to join strainer (2) to draw line (6). The strainer as illustrated is immersed in a pond and is intended to strain coarse debris which otherwise would become entrained in the draw line water as it is pumped through action of pump (8). The connector (4) is intended to provide for an unlimited number of quick detachable or standard threaded connectors. Some connections may allow the strainer (2) to rotate or pivot without disturbing the draw line.

An example embodiment of strainer (2) is illustrated in FIGS. 2 to 5. In this embodiment, a doubled wall strainer (2) is provided, having an outer wall (10) of strainer media which will be described in more detail hereinafter, and an inner wall (12) of filter media (which may be of different composition and/or of different dimension than that of the outer wall),inwardly spaced from outer wall (10) (as will be understood for example from FIG. 3). This two wall or two stage strainer permits smaller diameter debris to flow through the outer wall and become trapped in the inner wall, while the outer wall traps larger debris.

Figure 3:
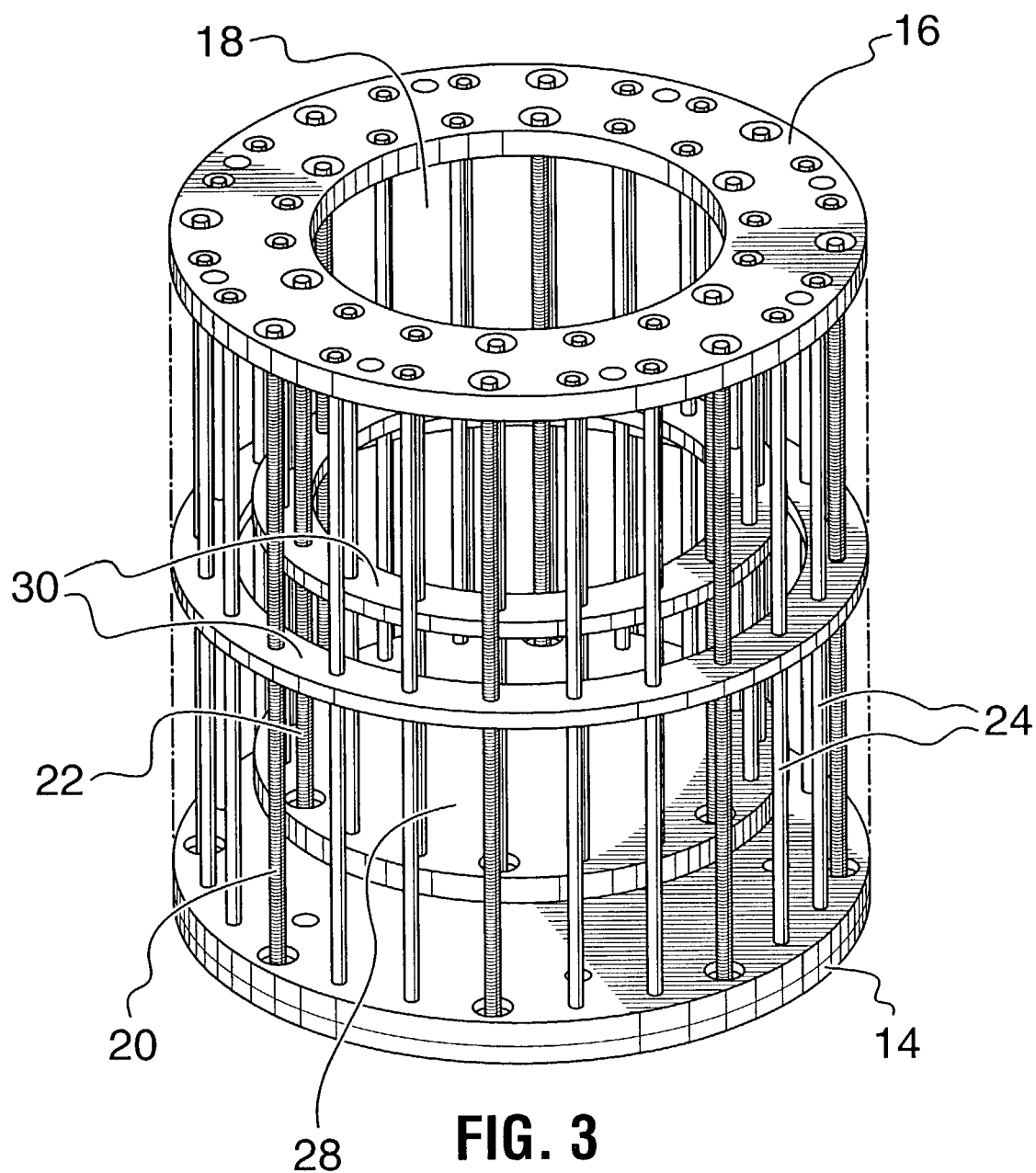
FIG. 3 is a perspective view of the strainer of FIG. 2 with the braided strainer walls removed.
Figure 8:
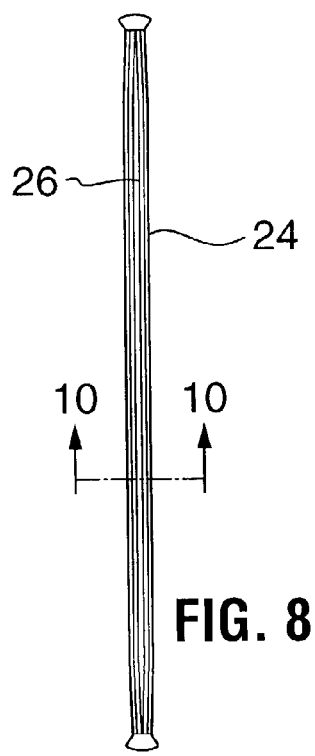
FIG. 8 is a side view of a rod forming a part of the framework of the strainer according to the invention.
Figure 9:
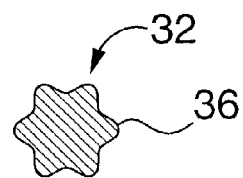
FIG. 9 is a cross-section view along line (9—9) of FIG. 7 of a strand of strainer medium in accordance with the present invention.
Figure 10:
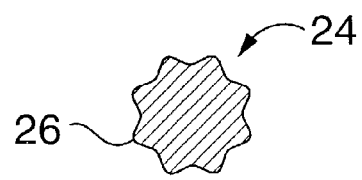
FIG. 10 is a cross-section view of the rod of FIG. 8 along line 10—10 of FIG. 8.

More particularly, as can be seen in FIG. 3, strainer 2 is made up of a cylindrical base plate (14) and an upper, annular plate (16), in the center of which is an aperture (18) through which strained fluid will flow to the draw line (6) during operation of the device. This upper plate (16) is common to both outer wall (10) and inner wall (12). A plurality of uniformly spaced, upstanding, parallel rods (20) are provided, positioned slightly inwardly from the peripheral edges of base plate (14) and upper plate (16) as illustrated. Every third rod (20) is a metal (e.g. stainless steel), threaded rod (22), and the two rods (24) in between are of appropriate metal or of plastic material such as polypropylene. These rods (24) have longitudinally extending ribs (26) on their outer surfaces to act as "deflector ribs" (FIGS. 8 and 9). These ribs may be outwardly extending, as shown, or formed as longitudinally extending grooves in the outer surfaces of the rods. These ribs generate certain vibrations and turbulence during fluid flow. The rods (22) and (24) are secured to base plate (14) for outer wall (10), and provide an anchored, vertical framework for the strainer A "play" may be provided in the rods (24) however to permit the framework of strainer (2) to move under stress conditions or abuse. This is accomplished for example by tapering rods near their ends, and mushrooming their ends as can be seen in FIG. 8. Similar threaded rods (22) and ribbed rods (24) are provided for inner wall (12), although these rods are anchored to inner wall base plate (28).

Intermediate plates (30) are provided and installed at specific locations along the vertical height of rods (22) and (24) as illustrated. These intermediate plates also extend outwardly beyond their corresponding rods (as do base plates (14) and (28) and upper plate (16)) and prevent the framework, provided by rods (22) and (24), from collapsing under heavy vacuum conditions during use of strainer (2).

Figure 4:
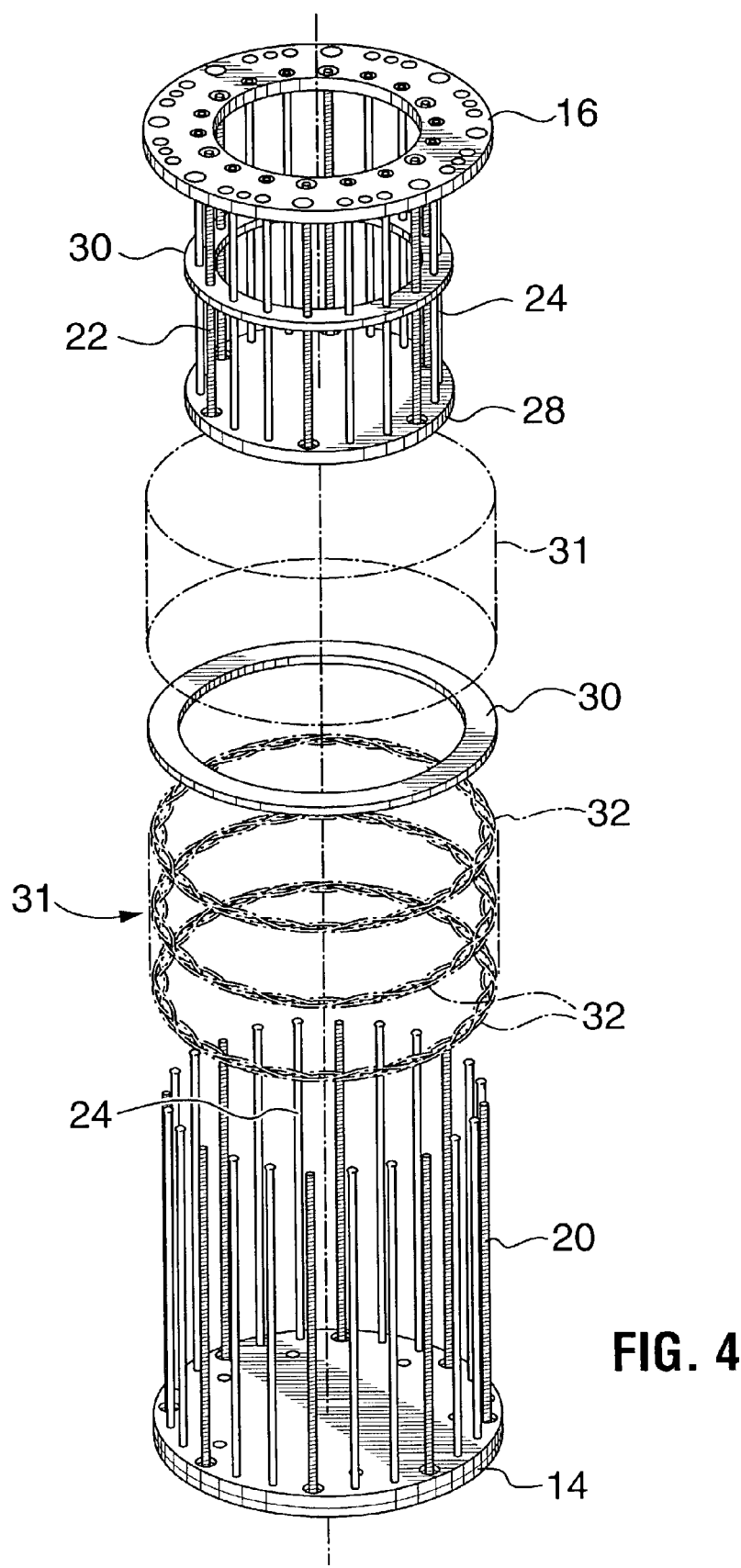
FIG. 4 is an exploded perspective view of the strainer of FIG. 2.
Figure 5:
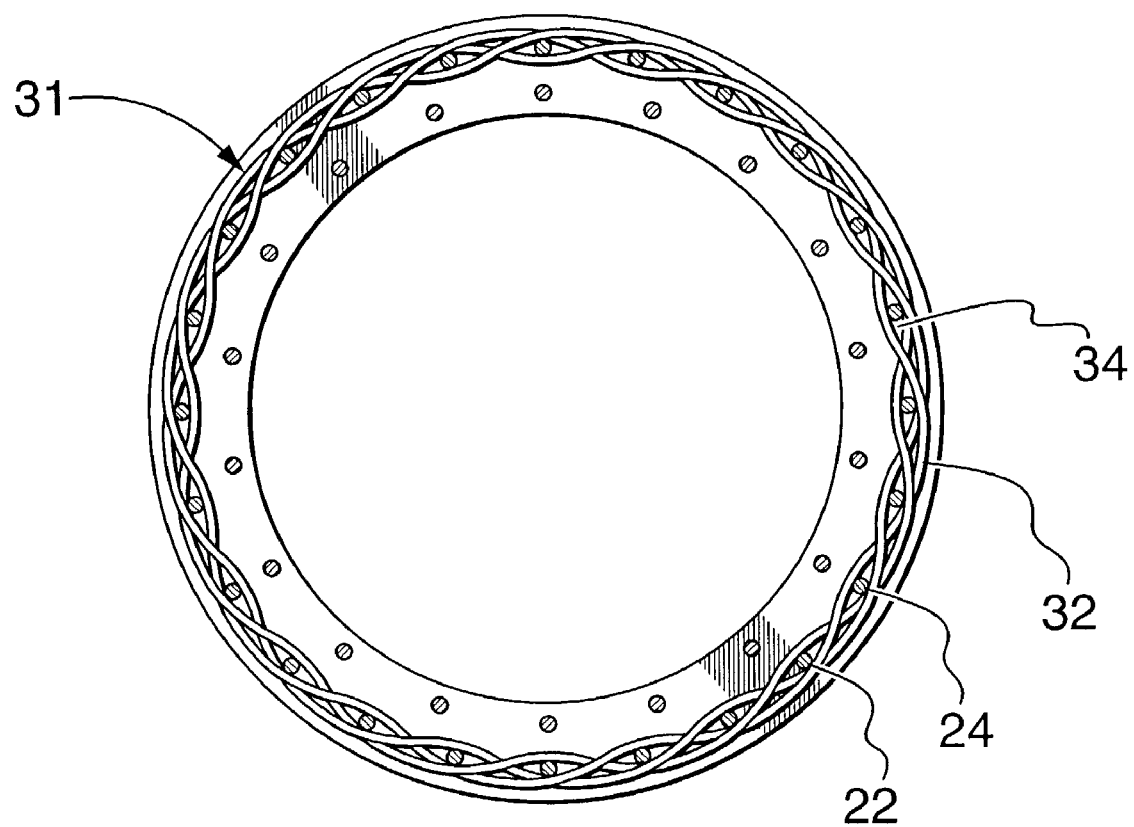
FIG. 5 is a section view along line 5—5 of FIG. 2.
Figure 6:
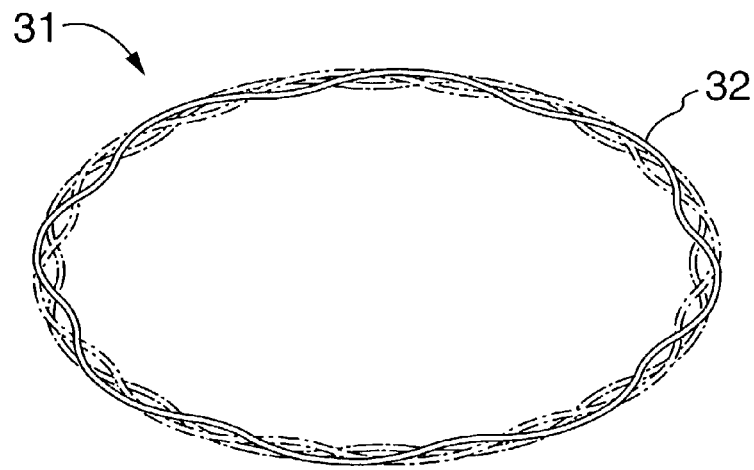
FIG. 6 is a perspective view of a braided cylindrical wall for use in a strainer according to the present invention.

Supported by the framework including rods (22) and (24) and upper plate (16) and base plates (14) and (28), in accordance with the present invention, are a plurality of stacked braided rings (31) or loops of strainer material. That strainer material is in the form of continuous strands (32) of metal or non-metal (e.g. plastic) compound as can be seen in FIG. 5 or 6. Preferably a loop of three braided strands is provided as a unit, a plurality of such units being stacked on rods (22) and (24), as illustrated in FIG. 4 to form outer wall (10). These rings (31) may be formed by casting or molding through an injection process, or bonded or chemically bonded. The strainer medium used may be selected according to desired chemical and physical properties such as chemical resistance, flexibility, tensile strength, elongation, expansion or contraction during temperature changes, etc.

That medium may be of any appropriate metal, metal alloy, non metal or plastic material. The rings are constructed with multiple chambers equally spaced on a specific circumference of the ring, and are provided with appropriately positioned rod-receiving holes (34) (FIG. 5) to enable individual rings to be stacked, in contiguous fashion, on rods (22) and (24), thereby forming outer wall (10). A plurality of smaller diameter rings of similar construction are stacked contiguously on the upstanding rods (22) and (24) of inner wall base plate (28), to form inner wall (12).

To control the size of objects that are allowed to flow through the strainer media forming outer wall (10) and inner wall (12), the diameter of the strands (32) is increased or decreased. For example if it is desired to strain objects larger than 5 millimeters, a set of rings (31) would be formed with five millimeter diameter strands. There is a wide range of available diameters for the strands because of the molding or casting process, since any reasonable size of medium strand may be cast or molded for any practical size of strainer and desired flow rate. In the illustrated embodiment, the two stage strainer (2) permits smaller diameter debris to flow through outer wall (10), formed with rings having larger diameter strands (32), and become trapped on the outside of inner wall (12) having smaller diameter strands (32). This construction with two different sized strainer media provides a significant enlarging of the surface area available to trap debris, thus prolonging the total obstruction of the media significantly when compared to a conventional strainer.

As can be seen in the cross-sectional view of a strand (32) illustrated in FIG. 9, strands (32) are preferably provided with a plurality of deflector ribs (36). These deflector ribs generate certain vibrations and turbulence to the fluid during flow, which in turn disturb the natural vortex caused by the drawing of fluids into the draw line through strainer (2). The strand deflector ribs (36) also become seated in the grooves of the threads of rods (22), thus resisting becoming longitudinally dislocated along the length of rods (22) and (24).

The braided strand construction of rings (31) forming the walls of strainer (2) during operation of the strainer causes the generation of numerous short and narrow vortexes instead of fewer and large vortexes. The larger vortexes will have a greater vacuum and draw more debris into the strainer, thus clogging the strainer at an earlier stage. Furthermore, because of the number of chambers in rings (31) and their location, the length or extension of the vortexes beyond the outer wall (10) is reduced. The vortexes generated by inner wall (12) are also disrupted by strands (32) of the rings (31) forming outer wall (10). This further reduces the amount of debris that can be drawn towards the outer surfaces of outer wall (10) and inner wall (12). The illustrated construction of strainer (2), with inner and outer walls, is ideal where the fluid bed (e.g. bottom of a river, container or pond) is easily disturbed by large vortexes caused by fluid flow.

It will be understood from the preceding description of strainer (2) that its construction is very straight forward. With annular upper plate (16) and intermediate plates (30) removed, and rods (22) and (24) secured to, respectively, base plates (14) and (28), loops (31) of appropriate diameter and having strands (32) of appropriate cross-sectional diameter and appropriately positioned rod receiving holes (34), are stacked contiguously on corresponding rods (22) and (24), with an intermediate plate (30), again having appropriately positioned rod-receiving apertures, being seated on a plurality of stacked loops, at the desired location. Further rings (31) are then stacked on intermediate plate (30), and, when the stacked loops reach the upper ends of rods (22) and (24), to complete outer wall (10) and inner wall (12), the common annular upper plate (16) is then secured to both sets of rods to form the braided strainer. An appropriate connector means 4 is provide for upper plate (16).

The advantages of this method of construction are many. The rings (31) have an unlimited stacking height depending upon the desired flow rate and the length of rods (22) and (24). A greater number of rings (31) on strainer (2), will produce a higher flow rate. The rings have an exact dimension that produces a constant, precalculated flow rate per ring. The ring strands (32) are designed and cast or molded with specific deflector ribs (36) on the circumferences of the strands. The number of deflectors (36) on each strand may be varied to suit the application or fluid type to generate desired vibrations and turbulence and assist in the breaking down of the flow of the vortexes. A further advantage of the strainer construction 2 according to the present invention is that, if damage occurs to strands 32, the appropriate ring 31 which has been damaged can be easily removed for replacement.

While rings (31) having three braided strands (32) have been illustrated, it will be understood that rings (31) may be manufactured with more than three strands.

While strainer (2) has been illustrated as having inner and outer walls, it will be readily understood that a strainer according to the present invention may be constructed having a single wall (e.g. with just outer wall (10) and base plate (14) with upper plate (16) and appropriate intermediate plate or plates (30) and rings (31) of braided strands (32)).

The positioning of upstanding rods (20) slightly inwardly of the outer peripheral portions of the base plate (14) and, intermediate and upper plates (30) and (16), provides protection for the strainer medium (strands (32)) of outer wall (10), for instance protecting the medium from direct damage when strainer (2) is dragged across a surface.

Figure 7:
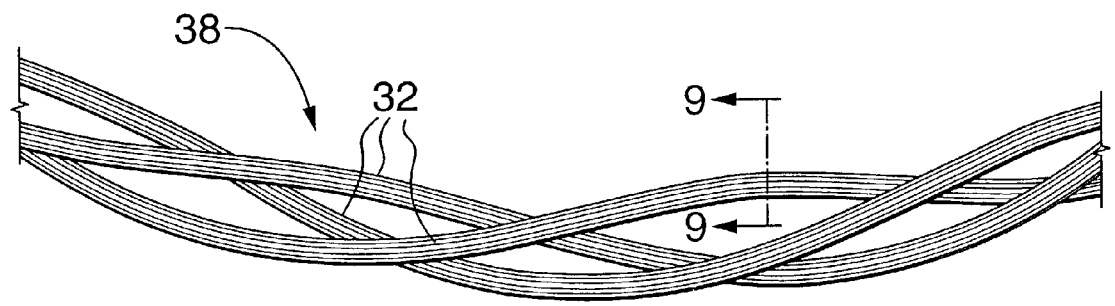
FIG. 7 is a partial perspective view of a length of braided strands of strainer medium used to produce an alternative embodiment of strainer according to the present invention.

In yet another embodiment of the present invention as can be seen in FIG. 7, instead of rings or loops (31) of strands (32), a single length (38) of braided strands (32) (preferably three such strands) may be manually or mechanically braided, the strands (32) having a specific diameter and, as appropriate, deflector ribs (36) extruded on their exterior surfaces. The strands would again be fitted on and supported by the upstanding rods (20), but would sit there as a continuous expanded braid to the upper plate height or, if required, to the intermediate plate height and then as a further continuous expanded braid from that intermediate plate to the upper plate.

Thus, it is apparent that there has been provided in accordance with the invention a braided strainer and method of making same that fully satisfies the objects, aims and advantages set forth above. While the invention has been described in conjunction with illustrated embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What is claimed is:

1. A method of forming a strainer for a draw line, said strainer comprising an outer strainer wall defining an enclosed interior space, said method comprising the steps of:
providing a frame comprising a base and an array of rods mounted to said base, said rods being parallel to each other, said array defining the position of said strainer wall;
providing at least one length of strainer medium comprising an elongate braided strand formed from a plurality of individual strands braided together, said braided strand having parallel lateral surfaces with an array of openings extending between said lateral surfaces for receiving said rods, said braided strand having sufficient length to extend around said array to define said wall;
attaching said strainer medium to said frame to form said wail by sliding said braided strand onto said rods through said openings to form said wall such that at least some of said rods protrude through said openings;
providing a cap comprising a member mountable to said at least some rods, and attaching said cap to said rods which protrude through said openings opposed to said base;
said cap or said base or both having an opening communicating with the interior of said strainer to connect with a draw line; and
said base, cap and strainer wall when assembled defining an enclosed space.

2. A method as defined in claim 1 wherein said strainer wall is substantially tubular.

3. A method as defined in claim 1 wherein said strainer medium comprises a plurality of discrete loops and said step of attaching comprises separately sliding said loops onto said array of rods.

4. A method as defined in claim 1 wherein said strainer medium comprises a continuous length of braided strainer medium and said step of attaching comprises continuously sliding said medium onto said rods while wrapping said length around said array to form as said wall a continuous helical member.

5. A method as defined in claim 1 wherein said base comprises a substantially flat plate which when in a generally horizontal orientation, said array of rods extends substantially vertically.

6. A method as defined in claim 1 wherein at least some of said rods have axially extending fluid deflecting ribs on their surfaces.

7. A method as defined in claim 1 wherein said rods are mounted to said base for relative movement therebetween.

8. A method as defined in claim 7 wherein said relative movement is provided by providing at the ends of said rods a bulbous member for fitting within a similar shaped opening within said base.

9. A method as defined in claim 1 comprising the further step of providing an inner strainer wall substantially coaxial with said outer strainer wall, said inner wall being formed by the method defined in claim 1.

10. A method as defined in claim 1 wherein at least some of said braided strands have axial fluid deflecting ribs on their surface.

11. A method of forming a strainer for a draw line, said strainer comprising an outer strainer wall defining an enclosed interior space, said method comprising the steps of:
providing a frame comprising a base and an array of rods mounted to said base, said rods being parallel to each other, said array defining the position of said strainer wall;
providing at least one length of strainer medium comprising an elongate braided strand formed from a plurality of individual strands braided together, said braided strand having parallel lateral surfaces with an array of openings extending between said lateral surfaces for receiving said rods, said braided strand having sufficient length to extend around said array to define said wail;

attaching said strainer medium to said frame to form said wall by sliding said braided strand onto said rods through said openings to form said wall such that at least some of said rods protrude through said openings;

providing a cap comprising a member mountable to said at least some rods, and attaching said cap to said rods which protrude through said openings opposed to said base;

said cap or said base or both having an opening communicating with the interior of said strainer to connect with a draw line;

said base, cap and strainer wail when assembled defining an enclosed space; and wherein said strainer medium comprises a plurality of discrete loops and said step of attaching comprises separately sliding said loops onto said array of rods.

12. A method as defined in claim 11 wherein said strainer medium comprises a continuous length of braided strainer medium and said step of attaching comprises continuously sliding said medium onto said rods while wrapping said length around said array to form as said wall a continuous helical member.

13. A method as defined in claim 11 wherein said base comprises a substantially flat plate which when in a generally horizontal orientation, said array of rods extends substantially vertically.

14. A method as defined in claim 11 wherein at least some of said rods have axially extending fluid deflecting ribs on their surfaces.

15. A method as defined in claim 11 wherein said rods are mounted to said base for relative movement therebetween.

16. A method as defined in claim 15 wherein said relative movement is provided by providing at the ends of said rods a bulbous member for fitting within a similar shaped opening within said base.

17. A method as defined in claim 11 comprising the further step of providing an inner strainer wall substantially coaxial with said outer strainer wall, said inner wall being formed by the method defined in claim 1.

18. A method as defined in claim 11 wherein at least some of said braided strands have axial fluid deflecting ribs on their surface.

19. A strainer for a draw line comprising an outer strainer wall defining an enclosed interior space and a frame for supporting said wall, said frame comprising a base and a cap spaced apart from each other by an array of parallel rods defining the position of said strainer wall, said rods having axially extending fluid deflecting ribs on their surfaces, at least one of said base and cap having an opening therein in communication with said interior space to receive and connect with a draw line, said strainer wall comprising at least one elongate strand of filter medium comprising a plurality of individual strands braided together, said filter medium having opposed lateral surfaces and array of openings extending between said lateral surfaces spaced to receive said rods, said braid being threaded onto said rods through said openings to define said filter wall.

20. A strainer as defined in claim 19 wherein said strainer wall is substantially tubular.

21. A strainer as defined in claim 19 wherein said strainer medium comprises a plurality of loops stacked onto said rods.

22. A strainer as defined in claim 19 wherein said strainer medium comprises a continuous length of braided strainer medium forming a helix.

23. A strainer as defined in claim 19 wherein said base comprises a substantially flat plate which when in a generally horizontal orientation, said array of rods extends substantially vertically.

24. A strainer as defined in claim 19 wherein said rods are mounted to said base for relative movement therebetween.

25. A strainer as defined in claim 19 further comprising an inner strainer wall substantially coaxial with said outer strainer wall, said inner wall being as defined in claim 19.

26. A strainer as defined in claim 19 wherein at least some of said individual strands have axial fluid deflecting ribs on their surfaces.

27. A strainer for a draw line comprising an outer strainer wall defining an en-closed interior space and a frame for supporting said wall, said frame comprising a base and a cap spaced apart from each other by an array of parallel rods defining the position of said strainer wall, said rods including at one end thereof a bulbous member for fitting within a similar shaped opening within said base to provide relative movement therebetween, at least one of said base and cap having an opening therein in communication with said interior space to receive and connect with a draw line, said strainer wall comprising at least one elongate strand of filter medium comprising a plurality of individual strands braided together, said filter medium having opposed lateral surfaces and array of openings extending between said lateral surfaces spaced to receive said rods, said braid being threaded onto said rods through said openings to define said filter wall.

* * * * *